United States Patent Office.

FRANCIS M. IRONMONGER, OF BROOKLYN, NEW YORK.

PROCESS OF BLEACHING EDIBLE NUTS.

SPECIFICATION forming part of Letters Patent No. 275,217, dated April 3, 1883.

Application filed February 13, 1883. (No specimens.)

*To all whom it may concern:*

Be it known that I, FRANCIS M. IRONMONGER, a citizen of the United States, residing at No. 103 Cambridge Place, Brooklyn, in the county of Kings and State of New York, have invented certain new and useful Improvements in Processes of Bleaching Edible Nuts; and I do declare the following to be a full, clear, and exact description of the invention, such as will enable others skilled in the art to which it appertains to make and use the same.

This invention is an improvement on the process covered by my Patent No. 126,550, dated May 7, 1872, and has relation to the cleaning and improving of the shells of edible nuts; and it consists in the following-described process:

As the nuts are generally dirty, they should be washed well in clear water, to which is added a little sal-soda—say one pound to fifty gallons of water—until they are clear of dirt. While this is not absolutely necessary, it is recommended in order that the subsequent baths may be kept clean. After washing off the dirt, remove the nuts and immerse them in a bath of oxalic acid dissolved in nine times its weight of clear water, and allow them to remain from one to five minutes, according to the strength of the oxalic solution and the nature of the shells of the nuts to be whitened. When they become clear and bright, take them out and wash them in clear water to remove the acid, and then dry them, as hereinafter explained.

If, on account of the nature of the shells of any of the nuts, they should not be sufficiently brightened, and it is desirable to have them lighter or brighter in color than the oxalic bath will make them after remaining in the bath five minutes, remove them and immerse them in chlorine water, which is made by dissolving chloride of lime in clear water, allowing the hydrate of lime to settle, using the pure chlorine water, when the shell will almost instantaneously be made lighter, after which they should be removed and washed in clear water to remove the chlorine. Chlorine being the bleaching agent, the same result will be obtained by using the chlorine water made in the manner named, or in other known ways of making chlorine water, and evolving the chlorine by pouring therein sulphuric or other acid, or by generating chlorine gas in other known ways, and allowing it to pass into a confined vessel with the nuts previously wet.

As oxalic acid and chloride of lime are of variable qualities, and the shells of some nuts require stronger and longer treatment than others, it is impossible to give very precise proportions of water to be used with the oxalic acid and chloride of lime. The proportions herein given will be found to afford the greatest satisfaction in the process; but should more water be used than the quantity stated, the same results will be obtained as to brightening or cleaning the nuts, but will require a longer time. After the nuts are brightened they are to be spread upon driers or trays and exposed to the sun or artificial heat until thoroughly dried, when they are ready to pack.

This process is designed to clean and improve edible nuts in order to render them more attractive, and thereby more valuable, as nuts of good quality and dark shells are less sought after than those having clean and light shells.

My process renders the nuts clean, bright, and attractive in color, and makes them as marketable as those having naturally bright shells.

Having thus described my invention, what I claim as new, and desire to secure by Letters Patent, is—

The process of bleaching and improving edible nuts herein described, consisting in first subjecting the nuts to a bath of water slightly charged with sal-soda, then removing the nuts and subjecting them to a bath of oxalic acid dissolved in clear water, then subjecting the nuts to the action of chlorine, and finally drying the nuts, substantially as set forth.

In testimony whereof I affix my signature in presence of two witnesses.

FRANCIS M. IRONMONGER.

Witnesses:
NEWBOULD B. SEATON,
J. DAN RICHARDSON.